United States Patent [19]
Shellhouse

[11] 3,877,228
[45] Apr. 15, 1975

[54] MASTER CYLINDER ASSEMBLY AND RESERVOIR FOR SAME

[75] Inventor: Ronald L. Shellhause

[73] Assignee: General Motors Corporation, Detroit, Mich.

[22] Filed: Apr. 19, 1974

[21] Appl. No.: 462,335

[52] U.S. Cl. ................................. 60/585; 60/562
[51] Int. Cl. ............................................. F15b 7/08
[58] Field of Search ............. 60/562, 535, 585, 588

[56] References Cited
UNITED STATES PATENTS

| | | | |
|---|---|---|---|
| 3,147,596 | 9/1964 | Wallace | 60/562 |
| 3,194,019 | 7/1965 | Lepelletier | 60/562 X |
| 3,470,695 | 10/1969 | Kilb | 60/562 X |

FOREIGN PATENTS OR APPLICATIONS

| | | | |
|---|---|---|---|
| 872,272 | 7/1961 | United Kingdom | 60/588 |

*Primary Examiner*—Martin P. Schwadron
*Assistant Examiner*—H. Burks, Sr.
*Attorney, Agent, or Firm*—D. D. McGraw

[57] ABSTRACT

A master cylinder assembly combines a cast body with a stamped primary reservoir chamber. The primary reservoir is a single chamber which feeds fluids to two secondary reservoir chambers located in the master cylinder body. The fluids in the two secondary chambers are fed through appropriate compensating ports into the bore of the dual pressurizing chamber master cylinder. The master cylinder pistons function in the conventional manner to pressurize wheel brakes. The stamped reservoir is attached to the molded master cylinder body by shouldered tubular members which thread into the secondary reservoir chambers. One of the members which secures the primary reservoir body to the master cylinder body is a tubular member having an externally threaded section below the shoulder thereof which is threaded into the upper portion of one of the secondary reservoir chambers. It also has a centrally apertured head section which is of greater diameter than the externally threaded section so as to provide the shoulder therebetween which tightly holds the primary reservoir chamber bottom against the master cylinder body. A baffle plate is installed in the tubular member immediately adjacent the apertured head section. The baffle plate has a plurality of apertures adjacent its outer periphery and a solid center section which is in axial alignment with the cental aperture of the head section. This arrangement provides a tortuous fluid flow path between the compensation port of the associated secondary fluid reservoir chamber and the primary reservoir chamber, thereby preventing a squirt-like return of fluid from the associated fluid pressurizing chamber of the master cylinder directly into the primary fluid reservoir upon brake release.

2 Claims, 2 Drawing Figures

MASTER CYLINDER ASSEMBLY AND RESERVOIR FOR SAME

The invention relates to a master cylinder of the type utilized in a hydraulic fluid brake system, and more particularly to one having a separate master cylinder body and primary reservoir body. It is an object of the invention to provide means securing the primary reservoir body to the master cylinder body utilizing a shouldered tubular member which provides additional structure improving the functional relationship of the reservoir chambers.

The invention is an improvement on the invention disclosed and claimed in U.S. patent application Ser. No. 408,461, filed Oct. 23, 1973, entitled "Master Cylinder". That patent application discloses a stamped steel primary reservoir chamber and a molded iron master cylinder body, the primary reservoir being a single chamber which feeds fluid to the two secondary reservoir chambers located in the master cylinder body. A single fluid level sensor is located in the primary chamber. The fluids in the two secondary chambers supply each of the two tandem master cylinder pressurizing chambers so that a loss of fluid in the primary reservoir does not result in a loss of reservoir fluid for both master cylinder pressurizing chambers.

It is an object of the invention to provide a headed tubular member which extends through an aperture in the bottom of the primary reservoir body and is threaded into the open end of a secondary reservoir chamber so as to fasten the primary reservoir body to the master cylinder body, the member also providing a baffle arrangement between the primary reservoir chamber and the secondary reservoir chamber which establishes a continuous but tortuous fluid flow path between the primary reservoir chamber and the compensation port located at the bottom of the secondary reservoir chamber and communicating with the master cylinder bore.

IN THE DRAWINGS

Figure 1:
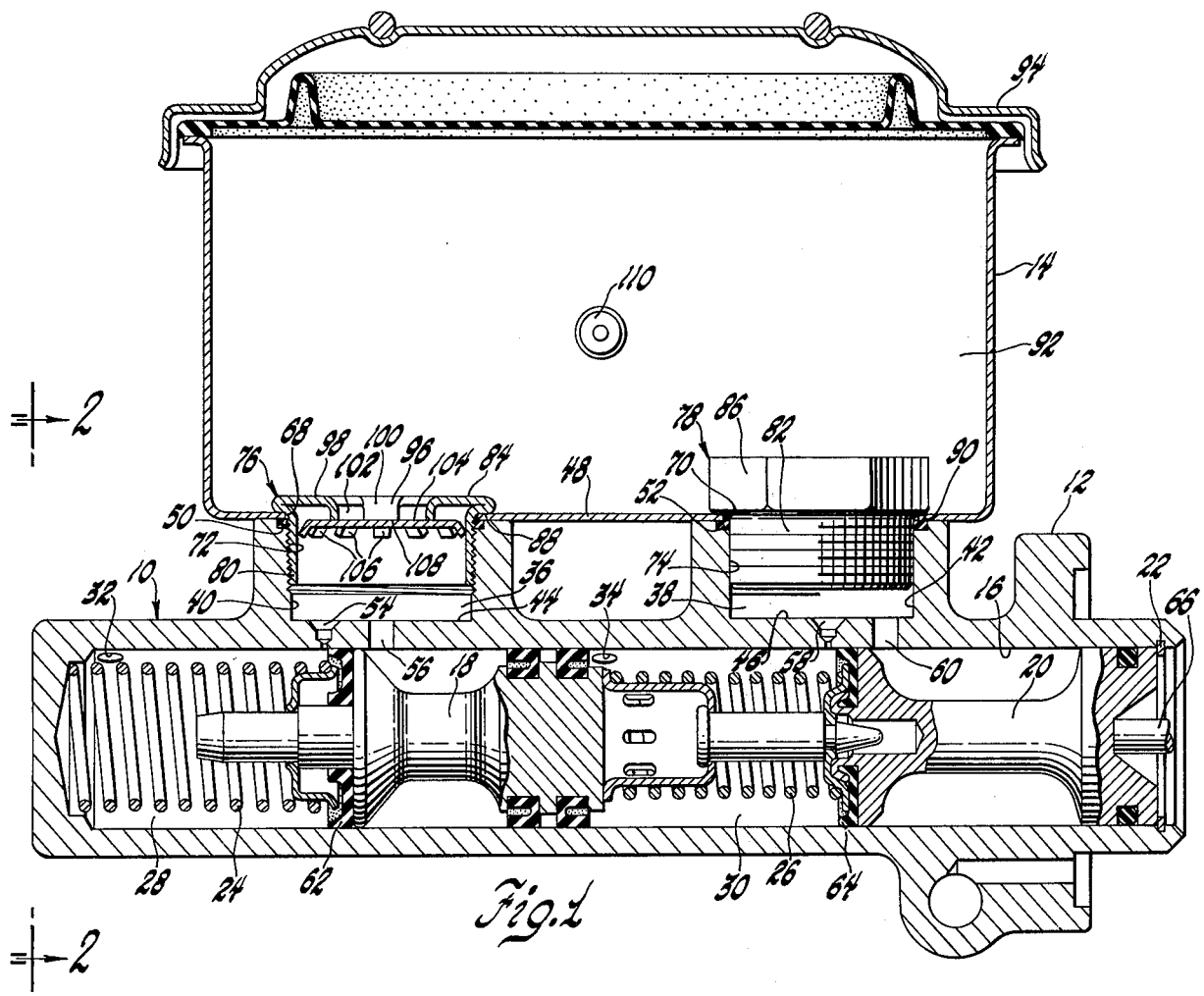
FIG. 1 illustrates a master cylinder assembly with parts broken away and in section, the assembly embodying the invention.
Figure 2:
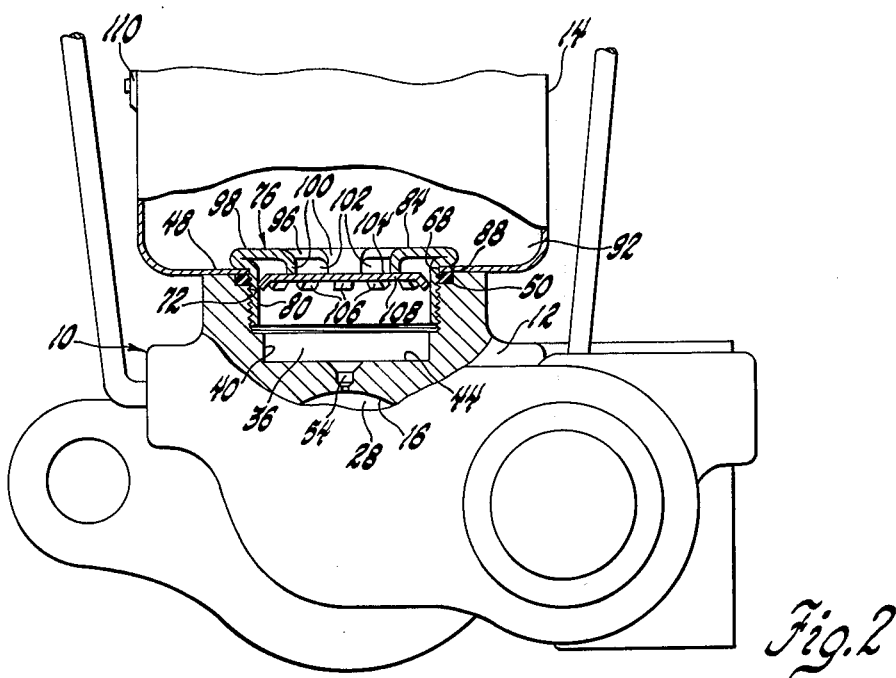
FIG. 2 is an end view of the master cylinder assembly of FIG. 1, taken in the direction of arrows 2—2 of that FIGURE, and having parts broken away and in section.

The master cylinder assembly 10 includes a master cylinder body 12 and a primary reservoir body 14. The master cylinder body is preferably a permanent mold iron housing, but may be made of other materials and by other processes while embodying the invention. A bore 16 is provided in the body 12 and pressurizing pistons 18 and 20 are reciprocably mounted in the bore. A piston stop 22 cooperates with the rear end of piston 20 and the piston return springs 24 and 26 to define the release position of the pistons, that position being shown in the drawing. The pistons cooperate with the bore 16 to define first and second pressurizing chambers 28 and 30. Outlets 32 and 34 are respectively connected to different brake fluid circuits in a vehicle brake system, all in a manner well known in the art.

The upper portion of the master cylinder body 12 is formed to provide secondary fluid reservoir chambers 36 and 38. The chambers are defined in part by their respective side walls 40 and 42 and their bottoms 44 and 46. These walls are integral parts of the cylinder body 12. The portions of the master cylinder body defining the side walls are preferably flat on their upper surfaces so as to receive the flat bottom 48 of the reservoir body 14 thereon in sealing relation. Suitable seals 50 and 52 are respectively provided to assure a fluid seal in each of these areas. The compensating ports 54 and 56, and the compensating ports 58 and 60, respectively provided through the secondary chamber bottoms 44 and 46, connect the secondary reservoir chambers with the bore 16. Ports 54 and 58 respectively communicate with the pressurizing chambers 28 and 30 when the master cylinder is in the release position shown. As is common in the art, these ports are closed by the piston seals or cups 62 and 64 when the pistons 18 and 20 are moved in a pressurizing direction by movement of the push rod 66, and are uncovered as the pistons return to the release position and are positioned by stop 22. The compensation ports are positioned in the bottoms of their respective secondary reservoir chambers well away from the chamber side walls 40 and 42.

The bottom 48 of the reservoir body 14 is provided with apertures 68 and 70 which fit over the open ends of the secondary reservoir chambers 36 and 38. At least the upper portions of the chamber side walls 40 and 42 have internally threaded sections 72 and 74, respectively, and apertures 68 and 70 are of a sufficient diameter to permit the insertion of threaded fastening members 76 and 78 so that they cooperate with the threaded sections 72 and 74 to tightly fasten the reservoir body 14 to the master cylinder body 12. Member 76 and 78 are formed as shouldered tubular members with externally threaded lower ends 80 and 82, respectively, the large diameter upper ends 84 and 86, respectively. This arrangement provides a shoulder 88 as a part of member 76 and a shoulder 90 as a part of member 78. These shoulders tightly engage reservoir bottom 48 when the members are threaded tightly into chambers 36 and 38.

The upper end 86 of member 78 extends generally vertically above reservoir bottom 48 into the primary reservoir section 92 and provides a dam which prevents fluid in chamber 38 from flowing out of that chamber and into the primary reservoir section when the fluid level is the primary reservoir section 92 falls below the lowest portion of the dam upper edge. Therefore member 78 provides an extension of chamber 38 into the primary reservoir section 92. The upper section 86 is a standpipe section and may be so shaped as to receive a suitable tool which can be used to thread member 78 into position during installation or to remove member 78 if needed. The removable seal cover 94 of the body 14 is not placed into position during assembly until members 76 and 78 have been threaded into their fastening positions. Likewise, cover 94 is removed to permit access of tools to remove the fastening members. The upper end 86 of member 78 is illustrated as being hexagonal to accept a similarly shaped hexagonal tool. Other suitable arrangements may be made for the accommodation of appropriate tools.

Fastening member 78 and its cooperative arrangement in the master cylinder assembly is the subject of patent application Ser. No. 462,355, entitled "Master Cylinder Assembly and Reservoir For Same", filed on the same date herewith in the names of Duane H. Harwick and Dwight W. McDaniel as inventors and assigned to the common assignee.

Member 76 has its upper end 84 formed as a head having a shoulder 88 on its lower side. The head section formed by upper end 84 is provided with a central aperture 96, the generally annular portion 98 surrounding aperture 96 extending inwardly so that it covers a substantial outer peripheral area of the open end of chamber 36. Aperture 96 is formed with circumferentially spaced and axially extending tabs 100 which extend into chamber 36 from the annular portion 98. The tabs may be arranged to provide chord-like aperture surfaces of a generally polygonal arrangement to receive a tool for threading member 76 into and out of chamber 36. Such a tool may be similar to the well known Allen wrench, for example. Also, the spaces 102 between adjacent tabs 100 permit fluid flow through the aperture 96 and past tabs 100 in a generally radial direction.

A baffle plate 104 is received in the upper portion of chamber 36 and in the lower end 80 of member 76. The baffle plate 104 is preferably castellated on its outer periphery to provide spring fingers or tabs 106 which grip the inner wall of member 76 and hold the baffle plate against the ends of tabs 100. The baffle plate has a solid center portion 108 which covers the inner end of aperture 96 so that any fluid passing through the aperture 96 must flow through spaces 102. The fluid can also flow past the spaces separating tabs 106. These latter spaces are preferably positioned radially outwardly of chamber 36 relative to the compensation ports 54 and 56. This arrangement provides a tortuous fluid flow path between the compensation ports and the primary reservoir section 92. As noted in the earlier filed patent application referred to above, this arrangement prevents undue transfer of fluid from the secondary reservoir chamber 36 to the primary reservoir chamber 92 which could sometimes otherwise occur during a quick brake release when the fluid level in chamber 92 is low. The expansion of fluid in chamber 28 under pressure when the brake is released can cause a squirt-like action of the fluid through compensation port 54 with sufficient velocity to carry some of the fluid out of the secondary reservoir chamber 36 and into the primary reservoir chamber 92. If the brake circuit connected with pressurizing chamber 30 had suffered a loss of pressure, this pumping action could contribute to pumping fluid from pressurizing chamber 28 so as to unnecessarily deplete the brake circuit connected with that chamber. By providing a baffle arrangement, this action is effectively prevented.

As is disclosed in the earlier filed patent application referred to above, a single fluid level sensor 110 may be provided in the primary reservoir chamber 92 and this sensor is used to detect the loss of fluid in either brake system. When the fluid level in chamber 92 falls below the level of sensor 110, whether from pressure loss or excessive brake lining wear, in either or both of the brake circuits served by the master cylinder, the sensor energizes a warning circuit. The single sensor simplifies the arrangement and results in a more economical assembly than is the case when separate sensors must be used for each brake circuit reservoir.

What is claimed is:

1. A master cylinder reservoir arrangement comprising:
    a master cylinder body having a first fluid reservoir chamber formed therein with an open top, a bottom provided with a compensation port, and a cylindrical side wall having an internally threaded section adjacent the open top;
    a main fluid reservoir body defining a second fluid reservoir chamber having a side wall and a removable sealing top and a bottom, said bottom having an aperture therein positioned over said first fluid reservoir chamber and being at least as large as said first fluid reservoir chamber open top;
    and means securing said main fluid reservoir body to said master cylinder body comprising a tubular member having an externally threaded section and a centrally apertured head section of greater diameter than said externally threaded section to provide a shoulder therebetween and a centrally apertured cap, said externally threaded section extending through said aperture and threaded into said internally threaded section of said first fluid reservoir chamber cylindrical side wall with said shoulder tightly engaging said second fluid reservoir chamber bottom to retain said main fluid reservoir body on said master cylinder body, said head section having a baffle plate adjacent thereto and mounted within the upper portion of said tubular member, said baffle plate having a plurality of apertures adjacent the outer periphery thereof and a solid center section in axial alignment with the aperture of said cap, said plurality of apertures being also positioned adjacent the inner wall of said tubular member externally threaded section to provide a tortuous fluid flow path between said second fluid reservoir chamber and said compensation port.

2. In a master cylinder assembly having a master cylinder body and a fluid reservoir body, said master cylinder body having a bore therein, first and second pressurizing pistons reciprocably received in said bore and defining therewith first and second fluid pressurizing chambers;
    first and second secondary fluid reservoir chambers formed in said master cylinder body each having an open top and an internally threaded side wall and a bottom provided with compensation port means connecting with said bore;
    a primary fluid reservoir provided by said fluid reservoir body and having first and second apertures in the bottom thereof aligned with said first and second fluid reservoir chambers;
    first and second externally threaded securing means having fluid passages therethrough and shoulders thereon and respectively extending through said apertures and threaded into said first and second secondary fluid reservoir chambers with said shoulders tightly engaging the bottom of said primary fluid reservoir to hold said fluid reservoir body on said master cylinder body;
    said first securing means having a circumferentially apertured baffle mounted in said fluid passage thereof and a center apertured top portion positioning said baffle in the upper end of said fluid passage with the baffle and top portion apertures being out of direct alignment with each other and the apertures of said baffle being out of direct alignment with said compensation port means to prevent a direct line of fluid flow between said compensation port means and said primary fluid reservoir and thereby prevent a squirt-like return of fluid from said first fluid pressurizing chamber directly into said primary fluid reservoir upon brake release.

* * * * *